United States Patent
Destruel et al.

(12) 
(10) Patent No.: US 6,806,419 B2
(45) Date of Patent: Oct. 19, 2004

(54) ACCESSORY FOR IMMOBILIZING AN ELECTRICAL DEVICE THAT CLIPS DIRECTLY INTO A TRUNKING BASE SECTION

(75) Inventors: Marc Destruel, Fleurine (FR); Jean-Claude Marcou, Limoges (FR); Didier Couzinet, Bethisy Saint Pierre (FR)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 10/319,471

(22) Filed: Dec. 16, 2002

(65) Prior Publication Data

US 2003/0132024 A1 Jul. 17, 2003

(30) Foreign Application Priority Data

Dec. 14, 2001 (FR) .......................................... 01 16223

(51) Int. Cl.[7] .............................................. H02G 3/04
(52) U.S. Cl. ........................... 174/48; 174/49; 174/68.3
(58) Field of Search .......................... 174/48, 49, 65 R, 174/68.1, 68.3, 72 C, 99 R, 135; 248/27.1, 544

(56) References Cited

U.S. PATENT DOCUMENTS

| | | | |
|---|---|---|---|
| 5,224,673 A | * | 7/1993 | Webb ........................... 174/48 |
| 5,957,414 A | * | 9/1999 | Perrignon de Troyes et al. 174/49 |
| 5,998,732 A | * | 12/1999 | Caveney et al. ............... 174/48 |
| 6,362,420 B1 | * | 3/2002 | Bacouelle et al. ............ 174/48 |
| 6,384,327 B1 | * | 5/2002 | Bellanger ..................... 174/48 |

FOREIGN PATENT DOCUMENTS

| | | | |
|---|---|---|---|
| EP | 0 838 885 A1 | 4/1998 | |
| EP | 844714 A1 | * 5/1998 | ............ H02G/3/12 |
| EP | 1 059 718 A1 | 12/2000 | |
| FR | 96 14439 | 5/1998 | |

\* cited by examiner

*Primary Examiner*—Anthony Dinkins
*Assistant Examiner*—Adolfo Nino
(74) *Attorney, Agent, or Firm*—Young & Thompson

(57) ABSTRACT

An accessory for immobilizing, an electrical device fitted into a longitudinal opening of a trunking base section and clipped directly to parallel clipping strips flanking the longitudinal opening includes a rigid member which is fitted transversely into the longitudinal opening of the trunking base section alongside an electrical device to stabilize locally the width of the longitudinal opening. The rigid member has on two parallel sides attachment arrangements adapted to cooperate with the clipping strips. The rigid member carries a locking lever one end of which has a bearing surface which bears on one of the clipping strips. The locking lever pivots between two positions, namely a rest position in which the bearing surface is at a distance from the clipping strip and a locking position in which the bearing surface is pressed against the clipping strip, exerting a pressure force thereon to lock the rigid member in position on the trunking base section.

25 Claims, 8 Drawing Sheets

ACCESSORY FOR IMMOBILIZING AN ELECTRICAL DEVICE THAT CLIPS DIRECTLY INTO A TRUNKING BASE SECTION

BACKGROUND OF THE INVENTION

1. Field of the invention

The present invention relates to an accessory for immobilizing an electrical device fitted into a longitudinal opening in a trunking base section and clipped directly to parallel clipping strips flanking said longitudinal opening, To be more specific, the immobilization accessory includes a rigid member adapted to be fitted transversely into the longitudinal opening in the trunking base section, beside the device, to stabilize the width of the longitudinal opening locally, the rigid member having, on two parallel sides, attachment means adapted to cooperate with the clipping strips.

2. Description of the prior art

The document FR 2 756 431 describes an immobilization accessory of the type previously cited.

The prior art accessory further includes locking means which comprise self-tapping screws engaged in holes formed in the vicinity of the attachment means of the rigid member. The screws are adapted to bite into the clipping strips to prevent movement in translation of the immobilization accessory and to immobilize the device mechanism in the direction of the axis of the trunking base section.

To fit the above locking means it is necessary to screw in the screws on each side of the rigid member, which is complicated and represents a finite installation time.

Furthermore, because they are additional components, the screws may be mislaid before they can be screwed into the rigid member.

The invention proposes an immobilization accessory that is novel compared to the prior art previously cited and has simple locking means that are easy and quick for an installer to use,

SUMMARY OF THE INVENTION

The invention provides an accessory for immobilizing an electrical device fitted into a longitudinal opening of a trunking base section and clipped directly to parallel clipping strips flanking the longitudinal opening, the accessory including a rigid member adapted to be fitted transversely into the longitudinal opening of the trunking base section alongside an electrical device to stabilize locally the width of the longitudinal opening, the rigid member having on two parallel sides attachment means adapted to cooperate with the clipping strips, in which accessory the rigid member carries a locking lever one end of which has a bearing surface adapted to bear on one of the clipping strips, the locking lever being adapted to pivot between two positions, namely a rest position in which the bearing surface is at a distance from the clipping strip and a locking position in which the bearing surface is pressed against the clipping strip, exerting a pressure force thereon to lock the rigid member in position on the trunking base section.

Other nonlimiting and advantageous features of the immobilization accessory according to the invention are as follows:

the bearing surface of each locking lever also bears on the bottom of the corresponding clipping strip;

the bearing surface of each locking lever has a substantially C-shaped profile;

the bearing surface of each locking lever has a right-angle profile;

the bearing surface of each locking lever carries a rib;

the bearing surface of each locking lever carries parallel ribs;

each locking lever is in one piece with the rigid member and is connected thereto by a flexible portion forming an articulation hinge, each locking lever is attached to the rigid member by mounting means forming an articulation hinge;

the immobilization accessory includes two locking levers;

the two locking levers have separate articulation axes;

the two locking levers have a common articulation axis;

the two locking levers are identical;

the two locking levers are different;

the rigid member carries a projecting hook adapted to cooperate with the locking lever to hold it in a locking position;

each locking lever pivots in a plane perpendicular to the back of the trunking base section so that the rest position of each locking lever is a raised position in which it is substantially perpendicular to the rigid member and the locking position of each locking lever is a lowered position in which it lies in the plane of the rigid member;

each locking lever pivots in a plane substantially parallel to the back of the trunking base section so that the rest position of each locking lever is a position laterally away from the axis of the rigid member and the locking position is a close together position in which it extends substantially along the axis of the rigid member;

the immobilization accessory further includes a cap adapted to be clipped onto the rigid member;

the immobilization accessory further includes, on the cap or on the rigid member, a series of notches adapted to cooperate with a complementary detent on the rigid member or on the cap so that the cap can assume different positions relative to the rigid member in a direction perpendicular to the longitudinal axis of the trunking base section;

a locking lever provides a cap of the rigid member;

the rigid member has, along a side perpendicular to those comprising the attachment means, a bearing strip shaped to assume a position under an embellisher of an electrical device fitted into the longitudinal opening of the trunking base section;

the rigid member has a bearing strip along each side perpendicular to those comprising the attachment means;

the two bearing strips are the same width;

the two bearing strips are different widths;

the rigid member has, on at least one bearing strip, abutment and locating means for an electrical device mounted in the longitudinal opening of the trunking base section.

The following description with reference to the accompanying drawings, which are provided by way of nonlimiting example, explains in what the invention consists and how it can be put into practice.

DETAILED DESCRIPTION OF THE PREFERRED EMBODIMENTS

Figure 1:
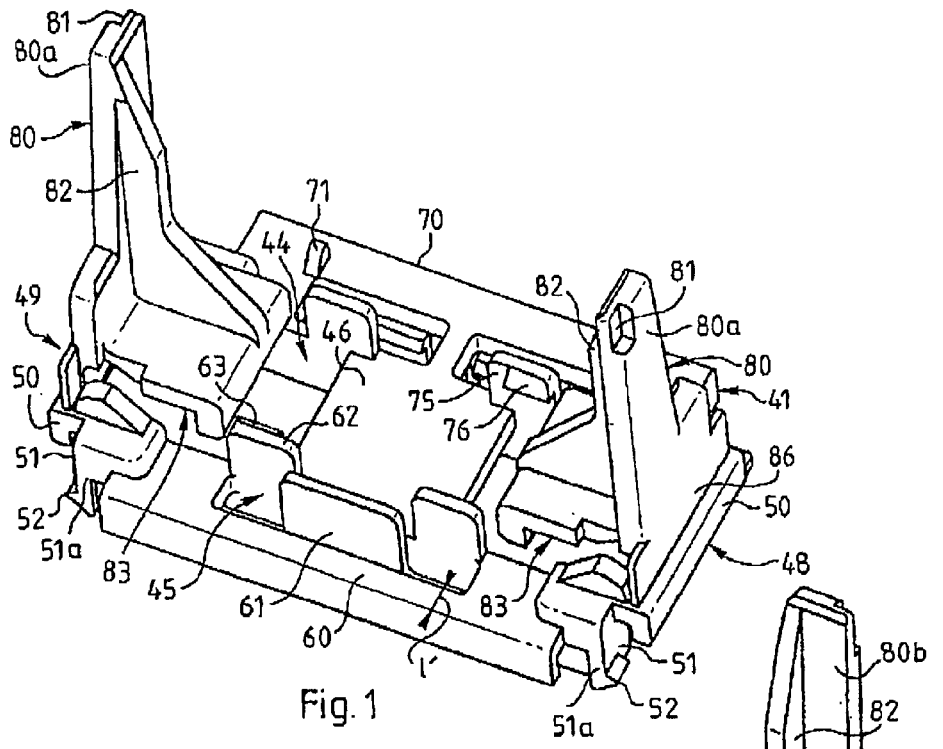
FIG. 1 is a diagrammatic perspective view of one side of a first embodiment of a rigid member of an immobilization accessory according to the invention.

FIGS. 5 and 7 to 11 show electrical power supply trunking 10 which comprises a trunking base section 11 with a globally U-shaped section comprising a back and two parallel longitudinal walls 13a, 13b attached to the back and perpendicular thereto.

A longitudinal opening 12 is defined between the parallel longitudinal walls 13a, 13b. The longitudinal opening 12 of the trunking base section 11 is closed by a length of cover section 20 (see FIG. 10).

The ribs and internal arrangements of the trunking, base section are not strictly relevant to the invention and are not described here in detail.

Each longitudinal wall 13a, 13b has, near its free edge, a clipping strip 14a, 14b which extends parallel to the longitudinal wall along a longitudinal axis of the trunking, along the whole length thereof. The two clipping strips 14a, 14b flank the longitudinal opening 12 of the trunking base section 11 and are parallel to each other.

Each clipping strip 14a, 14b is attached to the corresponding longitudinal wall 13a, 13b by a longitudinal spacer 15a, 15b which extends parallel to the back of the trunking base section 11 and runs the whole length of the trunking.

In conjunction with the corresponding longitudinal wall 13a, 13b and clipping strip 14a, 14b, each longitudinal spacer 15a, 15b forms a longitudinal groove 16a, 16b which is used in particular to fit the length of cover section 20.

Figure 10:
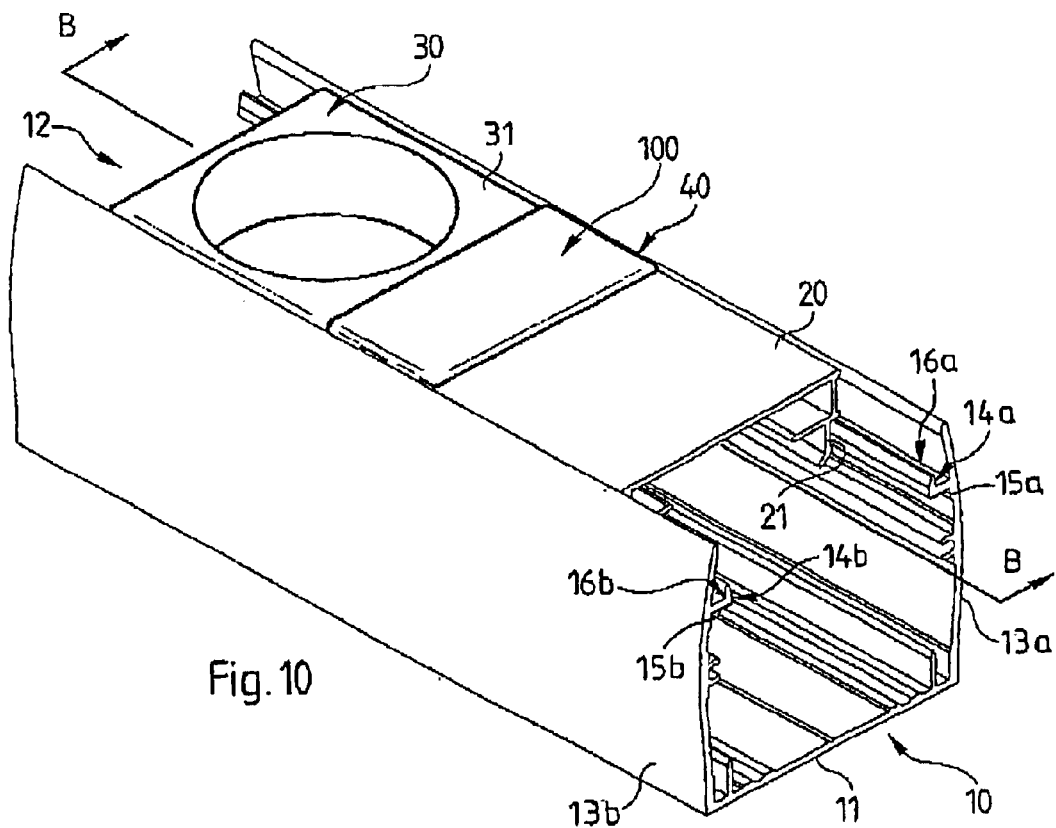
FIG. 10 is a diagrammatic perspective view of a trunking base section into which an electrical device is clipped and which is partly closed by a length of cover section, with an immobilization accessory of the kind shown in FIG. 5 fitted between the electrical device and the cut end of the length of cover section.

As shown more particularly in FIG. 10, to this end, the length of cover section 20 comprises mounting means on each of its longitudinal edges in the form of a rigid longitudinal tongue adapted to engage in the corresponding longitudinal groove 16a, 16b and a clipping tooth 21 adapted to clip under the corresponding clipping strip 14a, 14b.

Figure 5:
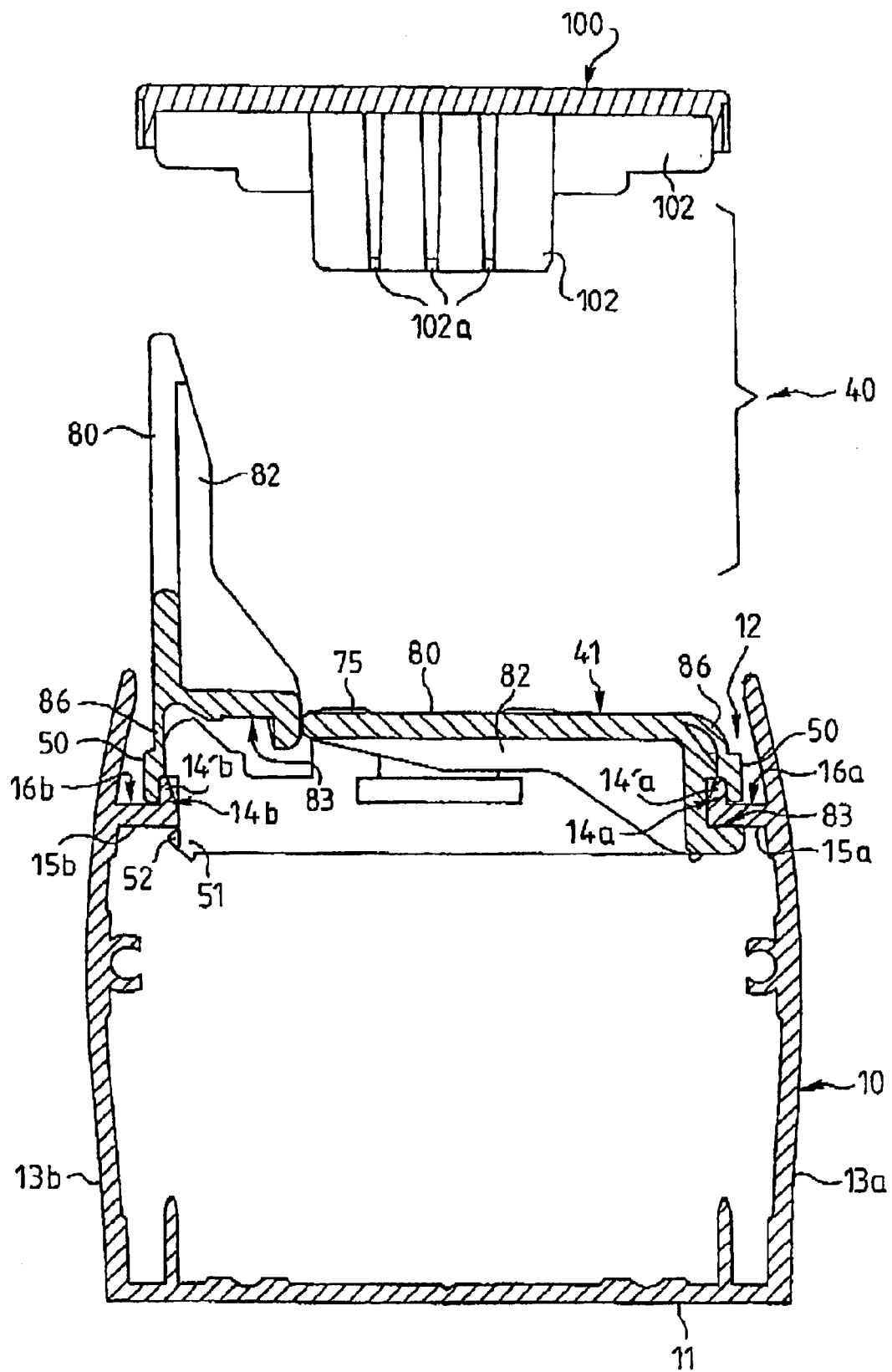
FIG. 5 is a view in cross section of a trunking base section into which the rigid member shown in FIG. 1 is fitted, with the cap from FIG. 4 shown in cross section above it.

Note that, in a first embodiment of the trunking base section 11 shown in FIG. 5, each clipping strip 14a, 14b extends from the longitudinal spacer 15a, 15b toward the front of the trunking base section 11 so that it forms only a projecting portion 14'a, 14'b extending higher than the corresponding longitudinal spacer 15a, 15b, a plane surface being provided under said longitudinal groove 16a, 16b.

Figure 7:
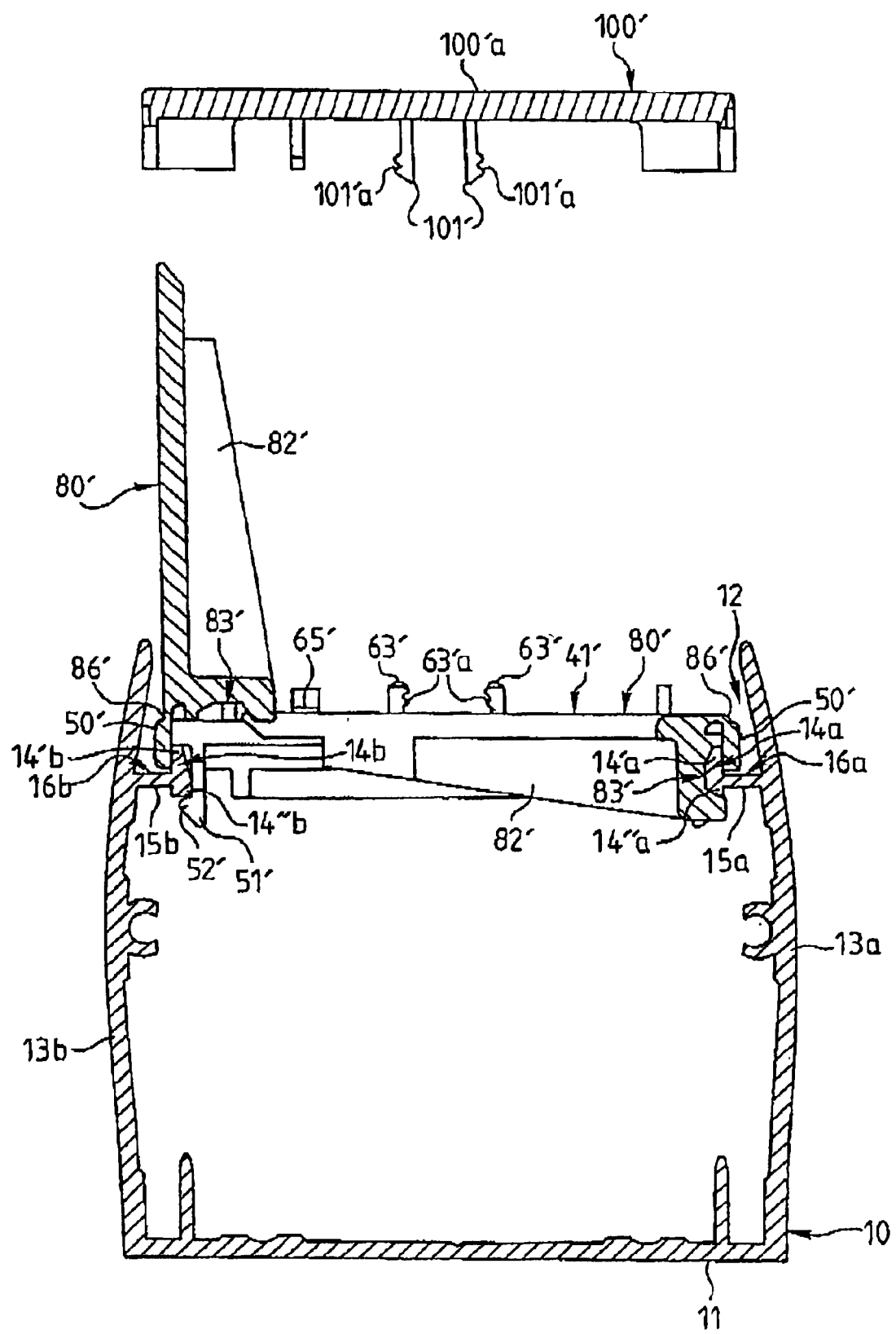
FIG. 7 is a view in cross section of a trunking base section into which the rigid member shown in FIG. 6A is fitted, with the cap from FIG. 6B shown in cross section above it.

In a second embodiment of the trunking base section 11, shown in FIG. 7, each clipping strip 14a, 14b has a projecting portion 14'a, 14'b extending above the corresponding longitudinal spacer 15a, 15b toward the exterior of the trunking base section 11 and a rib 14"a, 14"b projecting longitudinally under the longitudinal spacer 15a, 15b toward the interior of the trunking base section 11.

Whether it conforms to the first or second embodiment previously cited, each clipping strip 14a, 14b is adapted to enable electrical devices 30 to be clipped directly into the longitudinal opening 12 of the trunking base section 11.

To this end, each electrical device 30 includes clipping teeth and lugs adapted to cooperate with the corresponding clipping strips 14a, 14b.

Accordingly, each electrical device 30 is clipped on directly in the sense that it is nested, without using special fixing means, in the longitudinal opening 12 of the trunking base section 11 at the location chosen by the installer, the embellisher 31 of the electrical device 30 pressing directly or indirectly against the clipping strips 14a, 14b and the clipping teeth of each electrical device abutting against the ribs 14"a, 14"b of the clipping strip or against the plane surface under the corresponding longitudinal groove 16a, 16b.

The natural flexibility of the trunking base section 11 can lead to spreading of the two parallel longitudinal walls 13a, 13b on application of stress, i. e. to widening of the longitudinal opening 12, compromising correct retention of each electrical device 30.

For this reason, the invention provides an immobilization accessory 40, 40' adapted to be fitted into the longitudinal opening 12 of the trunking base section 11 in the vicinity of each electrical device 30 to prevent spreading of the longitudinal opening 12 of the trunking base section 11, at least locally.

To achieve this result, a single immobilization accessory 40, 40' is sufficient installed beside each electrical device 30, but it is preferable to use two accessories, one on each side of the device. If electrical devices are mounted side by side in the trunking base section, immobilization accessories are judiciously disposed between the devices to achieve adequate rigidity of the longitudinal walls of the trunking base section.

FIGS. 1 to 5 show a first embodiment of an immobilization accessory 40 of the above kind.

The immobilization accessory 40 essentially comprises a rigid member 41, which in this example is molded in one piece from a plastics material, and a cap 100, which is also molded from a plastics material.

Figure 2:
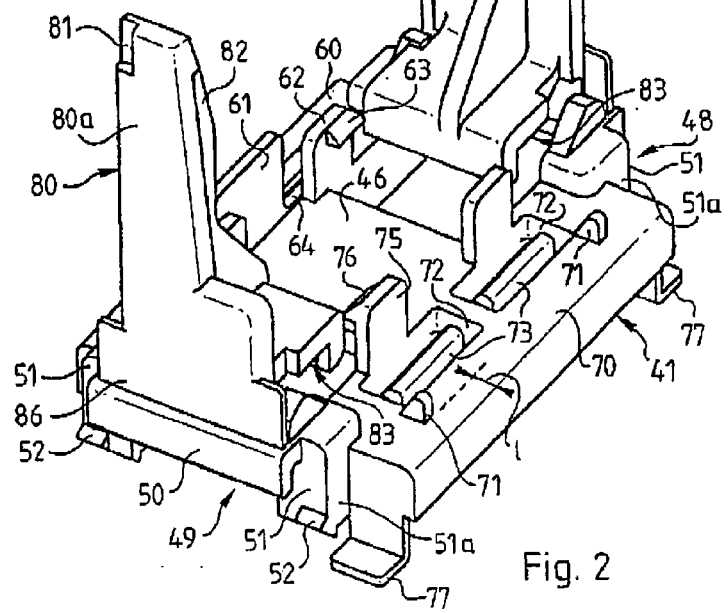
FIG. 2 is a diagrammatic perspective view of the other side of the rigid member from FIG. 1.
Figure 3:
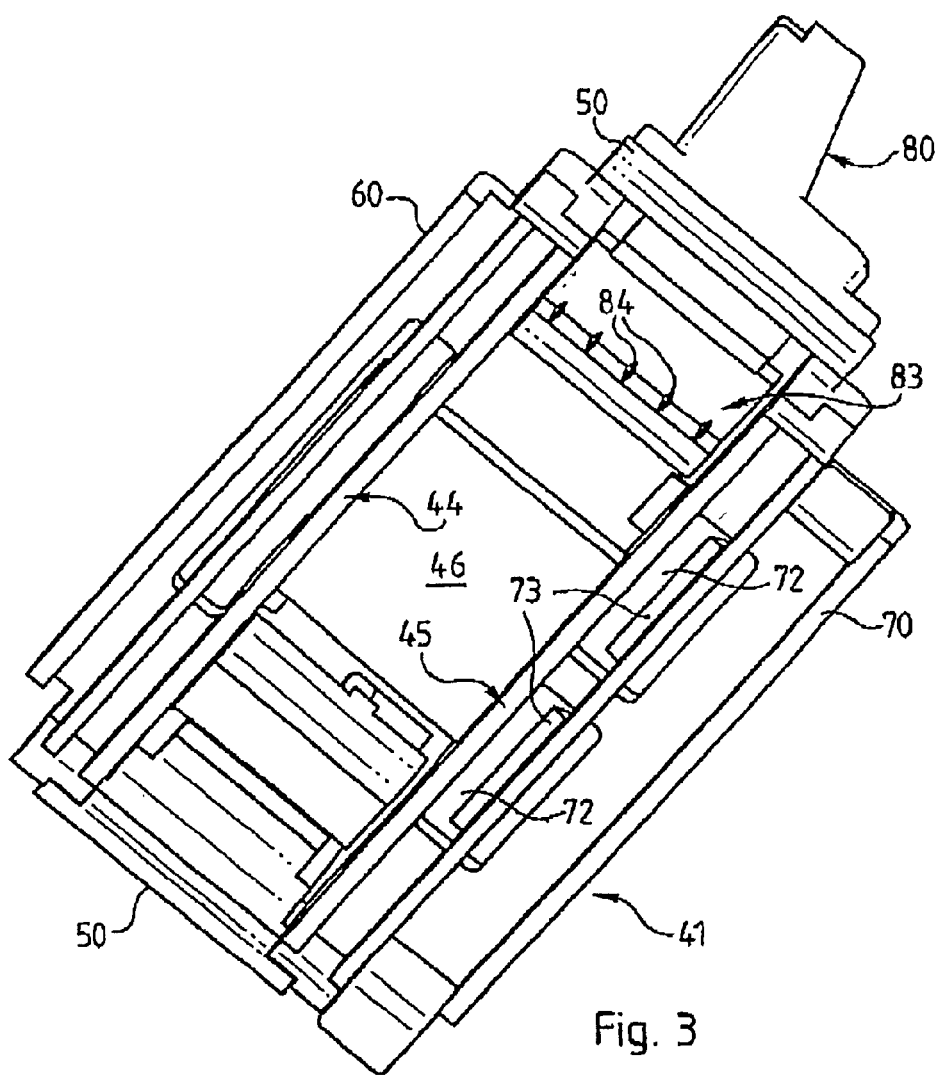
FIG. 3 is a bottom view of the rigid member from FIG. 1.

As shown more particularly in FIGS. 1 to 3, the rigid member 41 has a median wall 46 adapted to extend parallel to the plane of the longitudinal opening 12 of the trunking base section 11 and, on respective opposite sides of the median wall 46, stiffener strips 44, 45 which are molded in one piece with it and extend generally transversely to the two parallel opposite lateral sides 48, 49 of the rigid member 41. The two opposite lateral sides 48, 49 are provided with attachment means 50, 51, 52 adapted to cooperate with the clipping strips 14a, 14b.

To be more specific, attachments means are provided on each of the parallel opposite lateral sides 48, 49 of the rigid member 41, in the form of a projecting flat portion 50 forming a rigid hook defined along that side, elongate in the longitudinal direction of the trunking base section 11, and shaped to nest in the corresponding longitudinal groove 16a, 16b of the latter.

Furthermore, attachment means are provided on each of the parallel opposite lateral sides 48, 49 of the rigid member 41, in the form of two flexible lugs 51 on respective opposite sides of the projecting flat portion 50 and each having a tooth 52 at a free end.

The tooth 52 is shaped to bear either on the plane surface under the corresponding longitudinal groove 16a, 16b (see FIG. 5) or on the rib 14"a, 14"b projecting longitudinally toward the interior of the trunking base section 11 (see FIG. 7).

Of course, as an alternative to this, a single flexible lug with a clipping tooth could be provided on only one lateral side of the rigid member, the opposite other lateral side thereof having no such flexible lug and incorporating only the flat projecting portion forming a hook.

Furthermore, the rigid member 41 advantageously comprises locking means adapted to lock it in position on the trunking base section 11 and prevent it being subsequently moved unintentionally in translation along the longitudinal axis of the base section.

In the embodiment shown in FIGS. 1 to 5, the locking means comprise two identical locking levers 80, each locking lever 80 being attached to one of the parallel opposite lateral sides 48, 49 of the rigid member 41.

Each locking lever 80 is advantageously attached by means of a flexible portion 86 forming an articulation hinge for the locking lever 80. Each locking lever 80 is in one piece with the rigid member 41 and the flexible articulation hinge portion 86 is therefore formed in one piece with the locking lever 80 and the rigid member 41.

Of course, in a variant that is not shown, each locking lever could be attached to the rigid member by mechanical mounting means forming an articulation hinge.

As shown more particularly in FIGS. 1 and 2, each locking lever 80 extends from one lateral side 48, 49 of the rigid member 41 toward the opposite lateral side 48, 49 over the major portion of the length of the rigid member 41 and transversely to the longitudinal axis of the trunking base section 11.

Each locking lever 80 has a longitudinal stiffener rib 82 on a face 80b facing toward the interior of the trunking base section 11. Furthermore, each locking lever 80 has a step 81 at a free end on a face 80a facing toward the exterior of the trunking base section 11.

Each locking lever 80 has a bearing surface 83 adapted to bear on a corresponding clipping surface 14a, 14b at an end opposite its free end, i.e. at the same end as the flexible portion 86 forming an articulation hinge.

Each locking lever 80 is advantageously adapted to pivot between two positions, namely a rest position in which the bearing surface 83 is at a distance from the clipping strip 14a, 14b (see FIGS. 2 and 5, in which the locking lever 80 is in the raised position), and a locking position in which the bearing surface 83 bears against the corresponding clipping strip 14a, 14b, applying pressure thereto to lock the rigid member in position on the trunking base section 11 (see FIG. 5, in which the locking lever 80 is in the lowered position).

In the embodiment shown in FIGS. 1 to 5, the identical locking levers 80 have separate and parallel articulation axes.

The articulation axes of the locking levers 80 are parallel to the longitudinal axis of the trunking base section so that the locking levers pivot in planes perpendicular to the back of the trunking base section.

Accordingly, in their rest position, they are in the raised position and substantially perpendicular to the rigid member 41, and in their locking position they are lowered and substantially in the plane of the rigid member 41.

The bearing surface 83 of each locking lever 80 is shaped so that it also bears on the bottom of the corresponding clipping strip 14a, 14b.

In the embodiment shown in FIGS. 1 to 5, the bearing surface 83 of each locking lever 80 has a right-angle profile matching the external right-angle profile formed by the corresponding clipping strip 14a, 14b and the longitudinal spacer 15a, 15b to which the clipping strip is attached.

If each clipping strip 14a, 14b also forms a reentrant rib 14"a, 14"b extending toward the interior of the trunking base section 11, each bearing surface 83' of each locking lever 80' of the rigid member 41' has a substantially C-shaped profile which espouses the external shape of the clipping strip 14a, 14b (see FIG. 7).

Each bearing surface 83 of each locking lever 80 advantageously includes, in a portion forming a rim with respect to its main portion, a series of ribs 84 adapted to increase further the pressure or compression force exerted by the bearing surface 83 on the corresponding clipping strip 14a, 14b when the locking lever 80 is in the locking position. The ribs 84 are advantageously parallel to each other across the whole width of the corresponding bearing surface 83.

Of course, in a variant that is not shown, a single rib can suffice to increase the pressure force on the corresponding clipping strip.

Furthermore, the rigid member 41 advantageously has on each side of the median wall 46 a rigid lug 62, 75 carrying a tooth 63, 76.

Each rigid lug 62, 75 extends above the median wall 46, perpendicularly thereto.

The rigid lugs 62, 75 carrying the teeth 63, 76 form hooks cooperating with the locking levers 80 to hold them in the locking position, lowered onto the rigid member 41.

To this end, each tooth 63, 76 bears in the corresponding step 81 at the free end of the corresponding locking lever 80.

Figure 9:
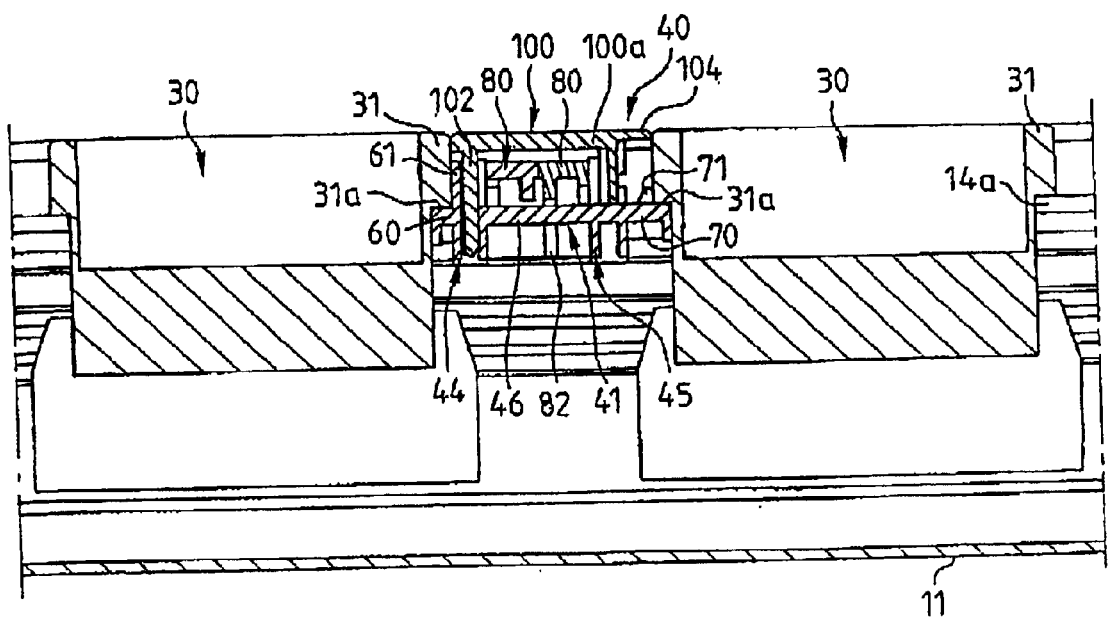
FIG. 9 is a view in longitudinal section taken along the line A—A in FIG. 8.
Figure 11:
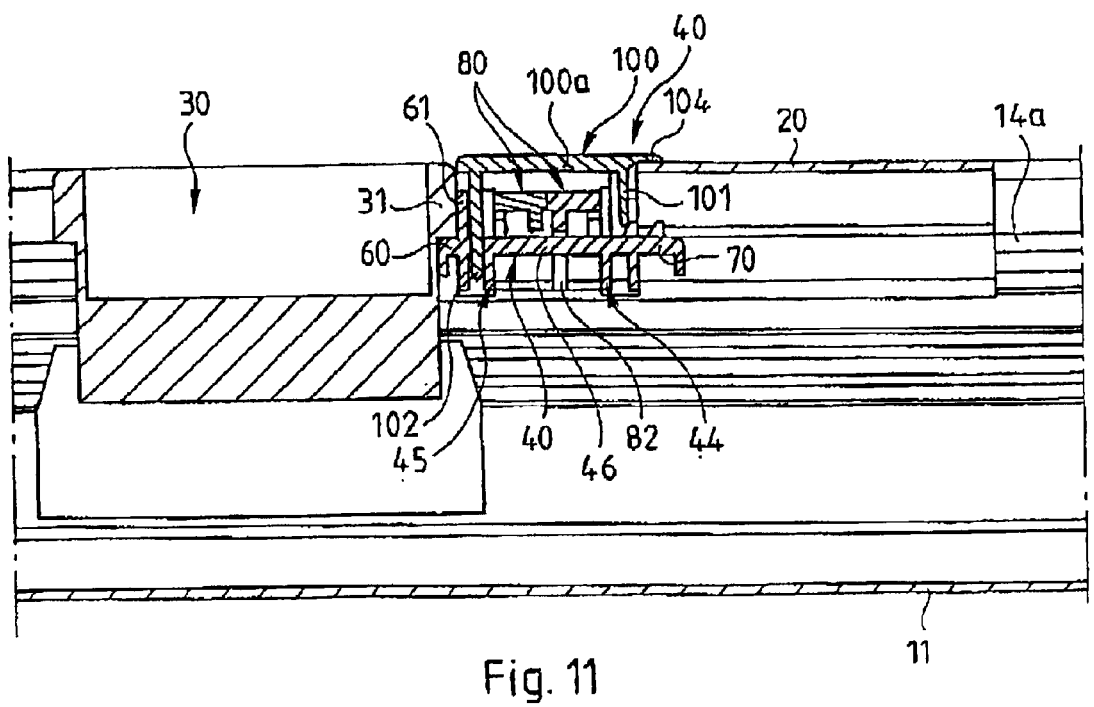
FIG. 11 is a diagrammatic view in longitudinal section taken along the line B—B in FIG. 10.

Moreover, the rigid member 41 has, along two longitudinal sides perpendicular to the lateral sides 48, 49 that include the attachment means, bearing strips 60, 70 shaped to be placed directly or indirectly under an embellisher 31 of an electrical device 30 fitted into the longitudinal opening 12 of the trunking base section (see FIGS. 9 and 11).

In the embodiment shown in FIGS. 1 and 2, the two bearing strips 60, 70 are different widths, the bearing strip 70 being wider than the bearing strip 60.

The wider bearing strip 70 carries two projecting abutments 71 adapted to locate an electrical device 30 mounted in the longitudinal opening 12 of the trunking base section 11.

The abutments 71 are relatively far apart. Furthermore, two openings 72 are provided in the bearing strip 70 into each of which projects a detent 73 for mounting the cap 100 of the immobilization accessory 40.

On the side with the bearing strip 60 there is a projecting guide wall 61 for guiding the cap 100 when it is fitted to the rigid member. An opening 64 is defined between the guide wall 61 and the rigid lug 62, in which a guide plate 102 carried by the cap 100 is adapted to engage.

Figure 4:
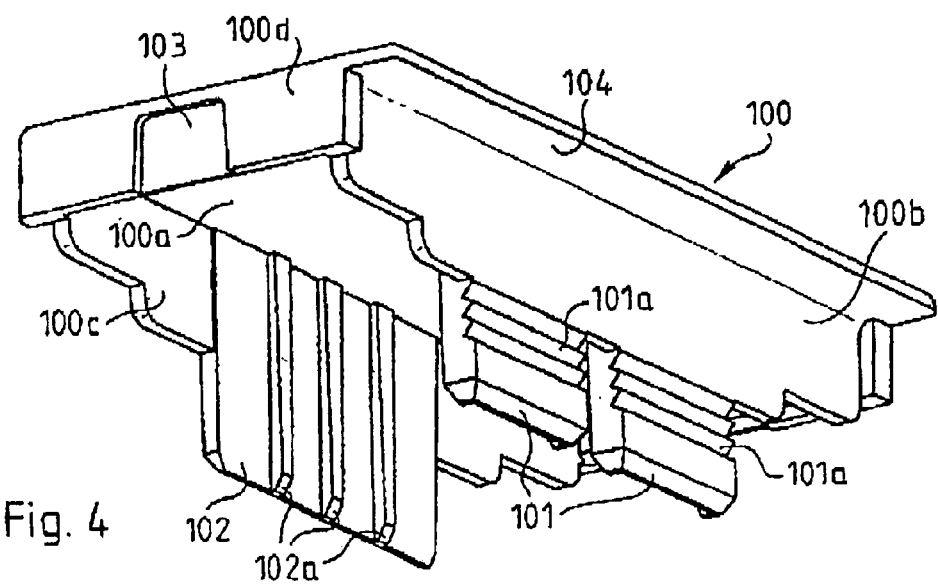
FIG. 4 is a perspective view of a cap adapted to be placed over the rigid member from FIG. 1.

To be more specific, the cap 100 shown in FIG. 4 has a central covering wall 100a adapted to cover the rigid member 41.

When the locking levers 80 have been lowered onto the rigid member (see FIG. 9, for example), the central covering wall 100a is substantially parallel to the back of the trunking base section 11.

The longitudinal edges of the central covering wall 100a carry two walls 100b, 100c substantially perpendicular to said covering wall. The wall 100b carries two lugs 101 each provided with a series of notches 101a adapted to cooperate with the detents 73 in the openings 72 of the bearing strip 70 of the rigid member 41.

The other wall 100c of the cap 100 parallel to the wall 100b carries a guide plate 102 with parallel longitudinal ribs 102a adapted to slide against the guide wall 61 and to engage in a corresponding opening 64 of the rigid member 41 situated between the guide wall 61 and the rigid lug 62 carrying the tooth 63 forming a hook for holding the corresponding locking lever 80 in the lowered position.

The guide plate 102 of the cap 100, which slides against the guide wall 61 of the rigid member 41, provides a bearing face to achieve correct clipping of the notches 101a on the lugs 101 of the cap 100 over the detents 73 in the openings 72 in the rigid member 41.

On one lateral side 100d the cap 100 has a notch 103 into which the tip of a tool can be inserted to separate the cap 100 from the rigid member 41.

Finally, on a longitudinal edge on the same side as the wall 100b, the cap 100 has a hood 104 which extends the whole length of that longitudinal edge and is adapted to cover a cut edge at the end of a length of cover section 20 clipped onto the trunking base section 11 (see FIG. 11).

How the immobilization accessory 40 is fitted between two electrical devices 30 clipped directly to the clipping strips 14a, 14b of the trunking base section 11 is described next with reference to FIGS. 8 and 9.

First of all, a first electrical device 30, which in this example is a socket outlet shown on the right-hand side in FIG. 9, for example, is clipped to the clipping strips 14a, 14b of the trunking base section 11.

The rigid member 41 is then fitted to the clipping strips 14a, 14b of the trunking base section 11 by means of its attachment means, the locking levers 80 being raised in the rest position.

To attach the rigid member 41, it is sufficient to position the projecting flat portions 50 forming hooks in the longitudinal grooves 16a, 16b and to clip the flexible lugs 51 carrying the teeth 52 under the clipping strips 14a, 14b, as previously described.

Then, with the locking levers 80 in the rest position, the rigid member 41 can be moved in translation toward the electrical device 30 until it bears against it.

In this bearing position, the bearing strip 70 of the rigid member is engaged directly or indirectly under the embellisher 31 of the electrical device and so a portion of the surface of the bearing strip 70 covers the lower surface 31a of the embellisher 31 of the electrical device 30.

The covering surface of the bearing strip 70 of width 1 extends between the longitudinal edge of the bearing strip 70 and the abutments 71 carried thereby, which are positioned against the embellisher 31 of the electrical device 30 (see FIG. 9).

By cooperation of the flat projecting parts 50 forming hooks with the clipping strips 14a, 14b, the rigid member 41 stabilizes the width of the longitudinal opening 12 of the trunking base section and prevents subsequent spreading of the longitudinal walls 13a, 13b of the trunking base section 11 if a traction force is exerted on the corresponding electrical device 30.

When the rigid member 41 has been positioned so that it bears against the first electrical device 30, the locking levers 80 are lowered onto the rigid member 41 in the locking position so that their bearing surface 83 is pressed against the corresponding clipping strip 14a, 14b, exerting a pressure force thereon reinforced by the ribs 84 carried by the bearing surface 83.

In this way the locking levers 80 lock the rigid member 41 in position on the trunking base section 11.

When each locking lever 80 reaches the locking position, lowered onto the rigid member 41, it cooperates with the hooks 62, 63, 75, 76 carried by the rigid member 41 so that it is held in this position.

The second electrical device 30, situated on the left-hand side in FIG. 9, is then fitted to the trunking base section 11 by clipping the electrical device 30 directly to the clipping strips 14a, 14b. The electrical device 30 is then moved in translation until it bears against the guide wall 61 of the rigid member 41 so that the lower surface 31a of the embellisher 31 of the electrical device 30 covers a width 1' of a portion of the bearing strip 60 of the rigid member 41.

Figure 8:
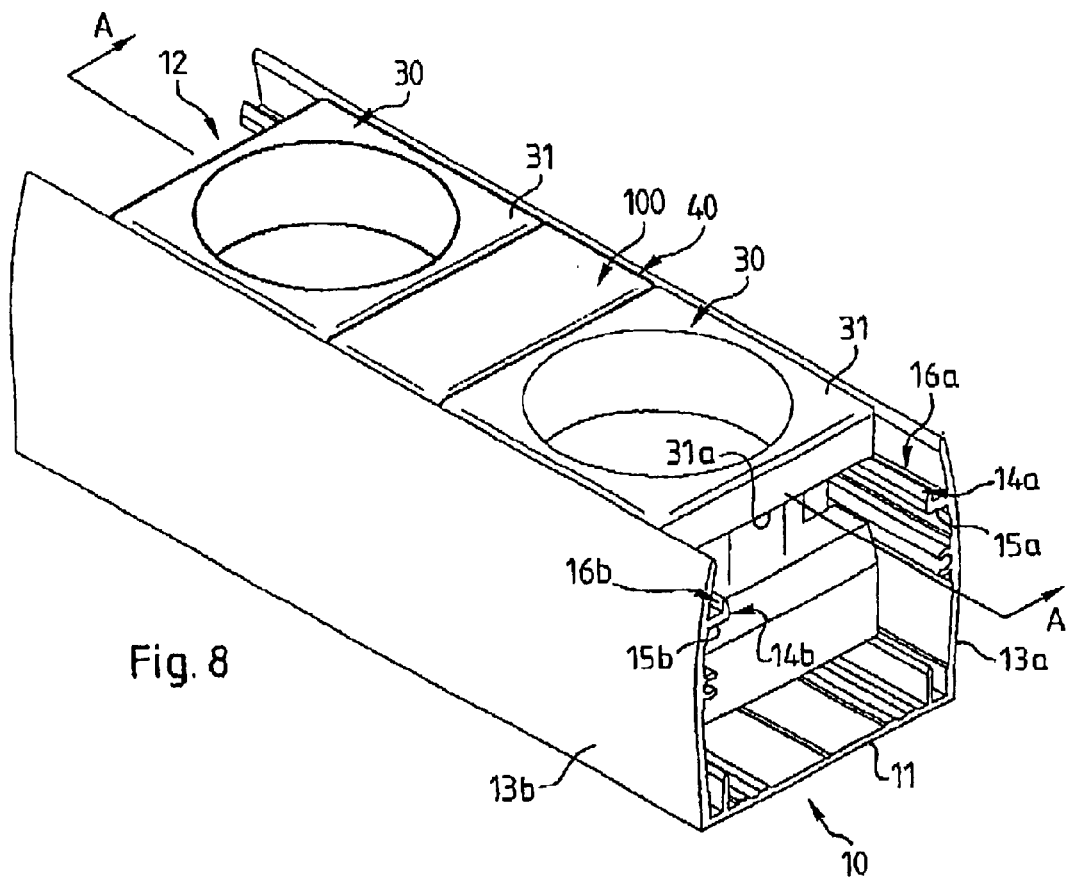
FIG. 8 is a diagrammatic perspective view of a length of trunking base section into which are clipped two electrical devices separated from each other by the immobilization accessory shown in FIG. 5.

Finally, it suffices to clip the cap 100 onto the rigid member 41 at a height such that the external face of its central covering wall 100a is flush with the external face of the embellishers 31 of the electrical devices 30, as shown more particularly in FIGS. 8 and 9.

Note that the rigid member 41 of the immobilization accessory 40 shown in FIGS. 1 and 2 has at each end of the bearing strip 70 a small right-angled tongue 77 adapted to engage under the corresponding clipping strip 14a, 14b to satisfy applicable standards regarding the subsequent introduction of foreign bodies into the interior of the trunking base section 11.

In fact, each small right-angle tongue 77 forms an obstacle at this location between the cap and the rigid member 41 to prevent the insertion of an object such as an iron wire.

The bearing strips 60, 70 also provide a seal at the junction between each electrical device 30 and the rigid member 41, which also prevents the subsequent introduction of objects into the interior of the trunking base section.

The cap 100 improves the overall aesthetics and also provides a seal.

Figure 12:
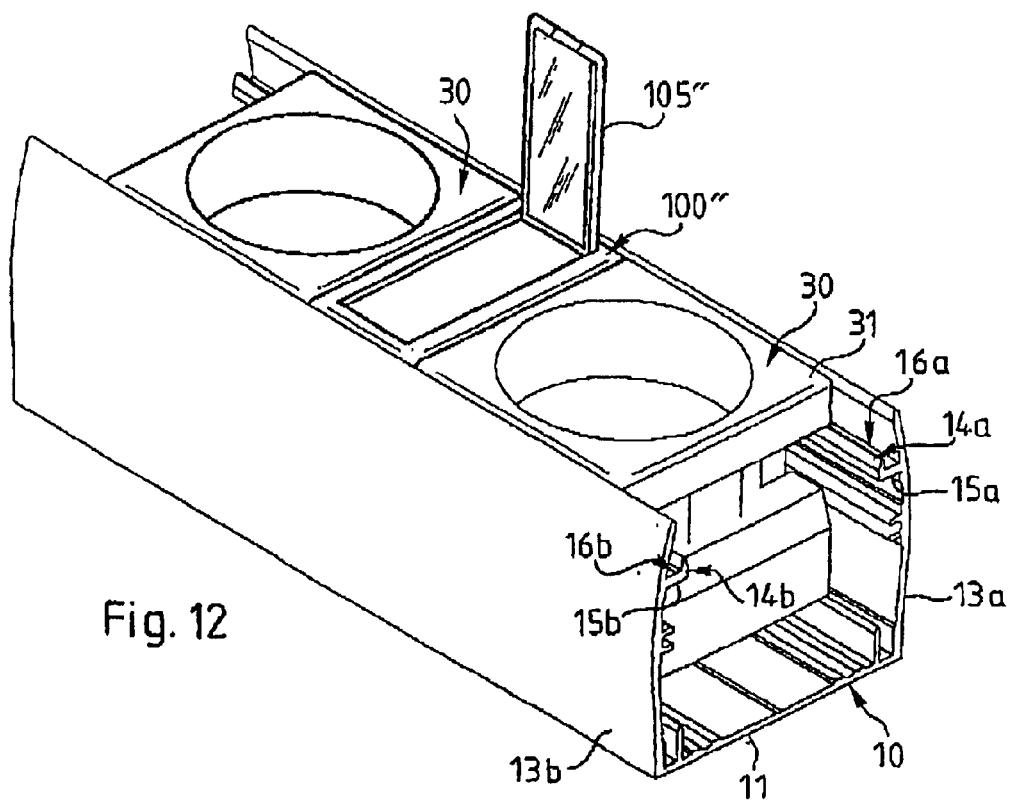
FIG. 12 is a diagrammatic perspective view of a length of trunking base section into which are clipped two electrical devices separated from each other by a variant of the immobilization accessory according to the invention.

In a variant shown in FIG. 12, the cap 100" can include a housing for a label covered by a transparent wall 105" which is pivotably mounted on the cap 100" and which is clipped to the cap in a direction perpendicular to the back of the trunking base section.

Fitting the immobilization accessory 40 according to the invention between an electrical device 30 and a length of cover section 20 is described next with reference to FIGS. 10 and 11.

The electrical device 30 and the rigid member 41 of the immobilization accessory 40 are mounted in the trunking base section 11 in exactly the same way as previously described, which will not be described again here.

Suffice to say that the electrical device 30, which is on the left-hand side in FIG. 11, is clipped directly to the clipping strips 14a, 14b of the trunking base section 11 because the rigid member 41 of the immobilization accessory 40 is clipped to the clipping strips 14a, 14b and is slid along so that its bearing strip 60 abuts against the electrical device 30 so that the embellisher 31 covers the bearing strip over a surface of width 1'.

When the rigid member 41 has been fitted onto the trunking base section 11, it is locked in position by the locking levers 80 lowered onto the rigid member 41, as previously described.

The length of cover section 20 is then clipped to the longitudinal walls 13a, 13b of the trunking base section 11 and is slid along until its cut edge abuts against the edge 51a of the flexible lugs 51 carried by the rigid member 41 on the same side as the bearing strip 70.

The cap 100 is then fitted to the rigid member 41 in the same way as previously described and is depressed until its hood 104 bears against the external face of the length of cover section 20, forming a seal preventing subsequent introduction of any object into the interior of the trunking base section 11 at this location.

Figure 6B:
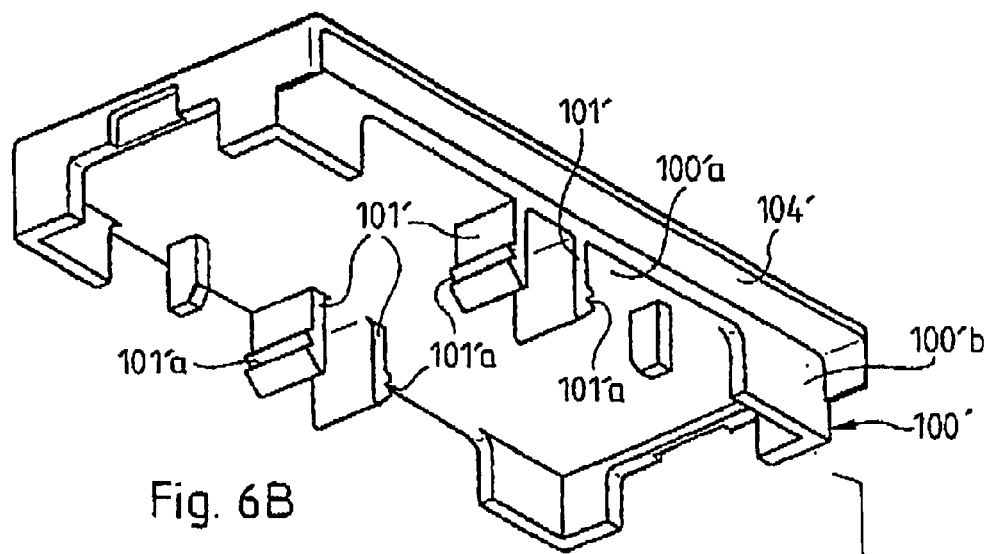
FIG. 6B is a diagrammatic bottom perspective view of a cap adapted to be fitted to the rigid member from FIG. 6A.
Figure 6A:
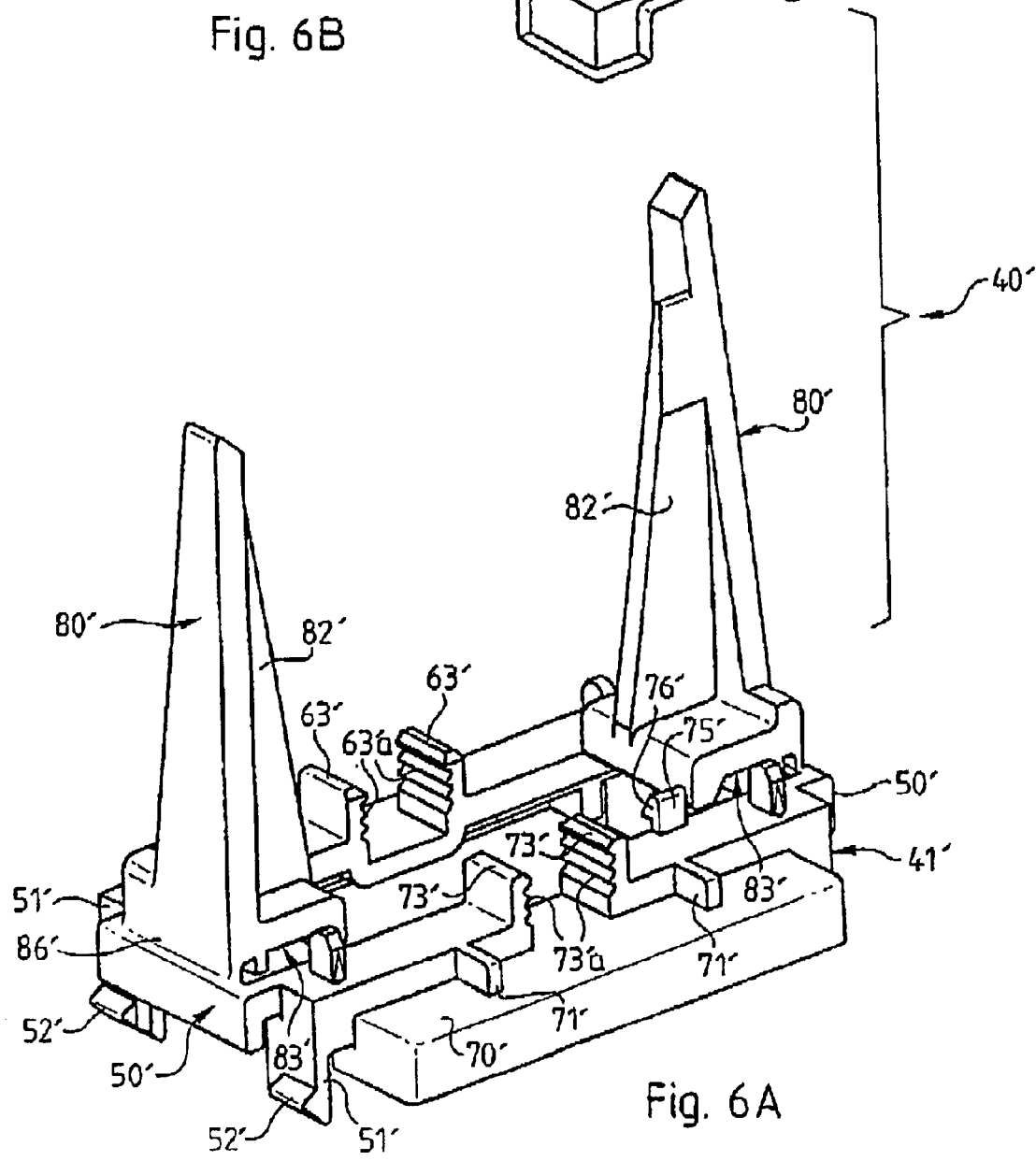
FIG. 6A is a diagrammatic perspective side view of a second embodiment of a rigid member of an immobilization accessory according to the invention.

FIGS. 6A, 6B and 7 show a variant of the immobilization accessory 40'.

This variant of the immobilization accessory 40' includes a rigid member 41' that is practically identical to the rigid member 41 of the immobilization accessory 40 previously described The rigid member 41' has on two opposite lateral sides projecting flat portions 50' forming hooks adapted to engage in the corresponding longitudinal grooves 16a, 16b of the trunking base section 11 and, on either side of each projecting flat part 50' forming a hook, flexible lugs 51' carrying a clipping tooth 52' adapted to cooperate with each corresponding clipping strip 14a, 14b and more particularly with each rib 14"a, 14"b projecting toward the interior of the trunking base section 11, as shown more particularly in FIG. 7.

Furthermore, the rigid member 41' carries two locking levers 80' attached to a lateral edge thereof by a flexible portion 86' forming an articulation hinge.

Each locking lever 80' is practically identical to the locking lever 80 of the rigid member 41. It carries on its interior face a longitudinal stiffener rib 82' and, at the end on the same side as the projecting flat portion 50' forming a hook, a bearing surface 83' which in this example has a substantially C-shaped profile adapted to bear against the corresponding clipping strip 14a, 14b in a locking position as shown in FIG. 7.

In this embodiment, each locking lever 80' is also adapted to pivot by means of its flexible portion 86' forming an articulation hinge between two positions, namely a raised position corresponding to the rest position in which each bearing surface 83' is at a distance from the corresponding clipping strip 14a, 14b, and a lowered position corresponding to the locking position in which each bearing surface 83' is adapted to be pressed against the corresponding clipping strip 14a, 14b, exerting a pressure force thereon to lock the rigid member 41' in position on the trunking base section 11.

Like the rigid member 41, the rigid member 41' also has on each longitudinal side perpendicular to the opposite lateral sides a bearing strip 70' which has the same function as the bearing strips 70, 60 of the rigid member 41.

In particular, the wider bearing strip 70' also carries projecting abutments 71' for locating an electrical device 30.

The essential difference between the rigid member 41' and the rigid member 41 concerns the clipping means of the cap 100'.

There are provided on the rigid member 41', on either side of the median wall (no reference number), a pair of facing lugs 63', 73' carrying a series of notches 63'a, 73'a adapted to cooperate with complementary detents 101'a on the projecting lugs 101' carried by the central covering wall 100'a of the cap 100'.

The rigid member 41' also carries projecting hooks 65', 75', 76' adapted to cooperate with each locking lever 80' to hold it in the locking position, lowered onto the rigid member 41'.

The cap 100' adapted to cooperate with the rigid member 41' is slightly different from the cap 100. It carries on one longitudinal side a hood 104' identical to that of the cap 100 and on its perimeter a wall 100' b adapted to cover the four corners of the rigid member 41'. At its center, the central covering wall 100' a carries on its internal face the lugs 101' already described.

Figure 13:
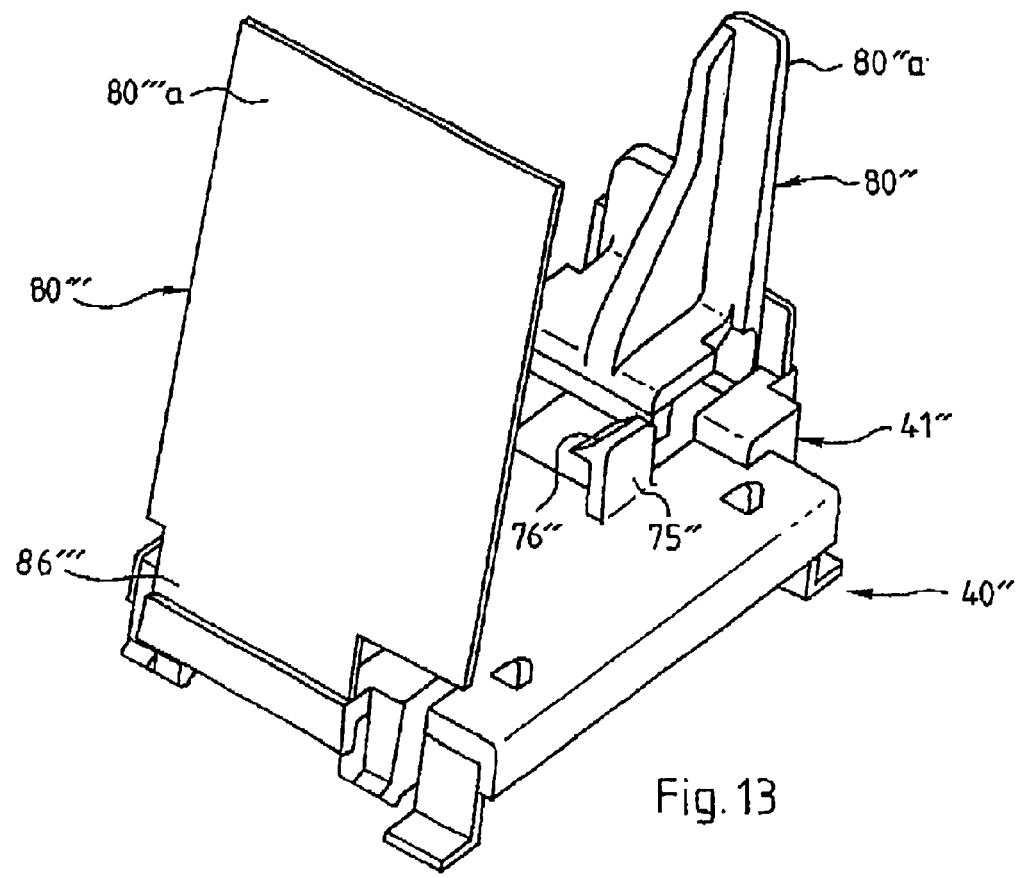
FIG. 13 is a diagrammatic side perspective view of a third embodiment of a rigid member of an immobilization accessory according to the invention.

FIG. 13 shows another variant of the immobilization accessory 40".

This variant of the immobilization accessory 40" has no attached cap, one of the two locking levers 80'" being adapted to serve as a cap.

The two locking levers 80", 80'" are then different.

The locking lever 80'", on the left-hand side in FIG. 13, is the shape of a rectangle whose surface area is equivalent to the surface area of the central covering wall of the cap 100 previously described.

When lowered, the locking lever 80'" covers all of the rigid member 41".

To this end, the articulation hinge 86'" of the locking lever 80'" is higher than the articulation hinge 86 of the locking lever 80, in order to move the articulation axis of the locking lever 80'" away from the trunking base section 11 and thereby allow the external face 80'"a of the latter to take up a position flush with the external faces of the embellishers after the locking lever 80'" has been placed in the locking position.

Of course, the bearing surface of the locking lever 80'" (which cannot be seen in FIG. 13) is designed to allow for this raising of the articulation axis of the lever.

The other locking lever 80", on the right-hand side in FIG. 13, is practically identical to the locking lever 80 previously described, except that it is shorter so as not to impede maneuvering of the locking lever 80'" also forming a cap for the immobilization accessory.

The looking lever 80" is locked first to the rigid member 41", with the tooth 76" carried by the rigid lug 75" bearing on the external face 80"a of the locking lever 80".

The locking lever 80'" is then lowered onto the rigid member 41" to cover the locking lever 80" and clip onto the rigid member 41".

In another variant, not shown, of the immobilization accessory, in which the attached cap is dispensed with, the two articulation axes of the locking levers are raised so that their external faces are flush with the external face of each embellisher when the levers are lowered onto the rigid member. The shape of the two locking levers is then adapted accordingly so that, by virtue of being complementary, they form a rectangular surface equivalent to that of the central covering wall of the cap 100.

The present invention is not limited to the embodiments described and shown, variants of which conforming to the spirit of the invention will suggest themselves to the person skilled in the art.

In particular, in variants of the invention that are not shown, the rigid member of the immobilization accessory includes a single locking lever.

The rigid member of the immobilization accessory according to the invention could equally well include two different locking levers.

In a variant that is not shown, the bearing strips provided on the longitudinal sides of the rigid member of the immobilization accessory are the same width.

The two locking levers of the rigid member could have a common articulation axis substantially at the center of the rigid member. In this case, each locking lever would have a combined pivoting and translation movement, the pair of locking levers operating substantially in the manner of a toggle clip between a rest position in which they are raised and inclined to each other and a locking position in which they are lowered, the articulation axis thus moving along an axis substantially perpendicular to the rigid member between the longitudinal walls of the trunking base section.

Finally, each locking lever could pivot in a plane substantially parallel to the back of the trunking base section around an axis perpendicular to the back of the base section. In this case, in the rest position of each locking lever the lever would be moved laterally away from the axis of the rigid member and the locking position would be a close together position in which the lever extends substantially along the axis of the rigid member.

What is claimed is:

1. An accessory for immobilizing an electrical device fitted into a longitudinal opening of a trunking base section and clipped directly to parallel clipping strips flanking said longitudinal opening, said accessory comprising:

a rigid member adapted to be fitted transversely into said longitudinal opening of said trunking base section alongside said electrical device to stabilize locally the width of said longitudinal opening, said rigid member having on two parallel sides attachment means adapted to cooperate with said clipping strips, said rigid member carrying a locking lever having a free end and an opposed end which has a bearing surface adapted to bear on one of said clipping strips, said locking lever being adapted to pivot between two positions, namely a rest position in which said bearing surface is at a distance from said clipping strip and a locking position in which said bearing surface is pressed against said clipping strip, exerting a pressure force thereon to lock said rigid member in position on said trunking base section.

2. The immobilization accessory claimed in claim 1 wherein said bearing surface of each locking lever also bears on the bottom of the corresponding clipping strip.

3. The immobilization accessory claimed in claim 2 wherein said bearing surface of each locking lever has a substantially C-shaped profile.

4. The immobilization accessory claimed in claim 2 wherein said bearing surface of each locking lever has a right-angle profile.

5. The immobilization accessory claimed in claim 1 wherein said bearing surface of each locking lever carries a rib.

6. The immobilization accessory claimed in claim 5 wherein said bearing surface of each locking lever carries parallel ribs.

7. The immobilization accessory claimed in claim 1 wherein each locking lever is in one piece with said rigid member and is connected thereto by a flexible portion forming an articulation hinge.

8. The immobilization accessory claimed in claim 1 wherein each locking lever is attached to said rigid member by mounting means forming an articulation hinge.

9. The immobilization accessory claimed in claim 1 including two locking levers.

10. The immobilization accessory claimed in claim 9 wherein said two locking levers have separate articulation axes.

11. The immobilization accessory claimed in claim 9 wherein said two locking levers have a common articulation axis.

12. The immobilization accessory claimed in claim 9 wherein said two locking levers are identical.

13. The immobilization accessory claimed in claim 9 wherein said two locking levers are different.

14. The immobilization accessory claimed in claim 1 wherein said rigid member carries a projecting hook adapted to cooperate with said locking lever to hold it in a locking position.

15. The immobilization accessory claimed in claim 1 further including a cap adapted to be clipped onto said rigid member.

16. The immobilization accessory claimed in claim 15 further including, on said cap or on said rigid member, a series of notches adapted to cooperate with a complementary detent on said rigid member or on said cap so that said cap can assume different positions relative to said rigid member in a direction perpendicular to the longitudinal axis of said trunking base section.

17. The immobilization accessory claimed in claim 1 wherein said locking lever provides a cap of said rigid member.

18. The immobilization accessory claimed in claim 1 wherein said rigid member has, along a side perpendicular to those comprising said attachment means, a bearing strip shaped to assume a position under an embellisher of an electrical device fitted into said longitudinal opening of said trunking base section.

19. The immobilization accessory claimed in claim 18, wherein said rigid member has a bearing strip along each side perpendicular to those comprising said attachment means.

20. The immobilization accessory claimed in claim 19 wherein said two bearing strips are the same width.

21. The immobilization accessory claimed in claim 19 wherein said two bearing strips are different widths.

22. The immobilization accessory claimed in claim 18 wherein said rigid member has, on at least one bearing strip, abutment and locating means for an electrical device mounted in said longitudinal opening of said trunking base section.

23. An accessory for immobilizing an electrical device fitted into a longitudinal opening of a trunking base section and clipped directly to parallel clipping strips flanking said longitudinal opening, said accessory comprising:

a rigid member adapted to be fitted transversely into said longitudinal opening of said trunking base section alongside said electrical device to stabilize locally the width of said longitudinal opening, said rigid member having on two parallel sides attachment means adapted to cooperate with said clipping strips, said rigid member carrying a locking lever, one end of which has a bearing surface adapted to bear on one of said clipping strips, said locking lever being adapted to pivot between two positions, namely a rest position in which said bearing surface is at a distance from said clipping strip and a locking position in which said bearing surface is pressed against said clipping strip, exerting a pressure force thereon to lock said rigid member in position on said trunking base section, and wherein said locking lever pivots in a plane perpendicular to the back of said trunking base section so that the rest position of said locking lever is a raised position in which it is substantially perpendicular to said rigid member and the locking position of said locking lever is a lowered position in which it lies in the plane of said rigid member.

24. An accessory for immobilizing an electrical device fitted into a longitudinal opening of a trunking base section and clipped directly to parallel clipping strips flanking said longitudinal opening, said accessory comprising:

a rigid member adapted to be fitted transversely into said longitudinal opening of said trunking base section alongside said electrical device to stabilize locally the width of said longitudinal opening, said rigid member having on two parallel sides attachment means adapted to cooperate with said clipping strips, said rigid member carrying a locking lever, one end of which has a bearing surface adapted to bear on one of said clipping strips, said locking lever being adapted to pivot between two positions, namely a rest position in which said bearing surface is at a distance from said clipping strip and a locking position in which said bearing surface is pressed against said clipping strip, exerting a pressure force thereon to lock said rigid member in position on said trunking base section, and wherein said locking lever pivots in a plane substantially parallel to the back of said trunking base section so that the rest position of said locking lever is a position laterally away from the axis of said rigid member and the locking position is a close-together position in which it extends substantially long the axis of said rigid member.

25. An accessory for immobilizing an electrical device fitted into a longitudinal opening of a trunking base section and clipped to parallel clipping strips flanking said longitudinal opening, said accessory comprising:

a rigid member adapted to be fitted transversely into said longitudinal opening of said trunking base section to stabilize locally the width of said longitudinal opening, said rigid member having parallel sides provided with attachment means adapted to cooperate with said clipping strips, said rigid member carrying a locking lever having a free end and an opposed end, said opposed end of said locking lever being provided with a bearing surface adapted to bear on one of said clipping strips, said locking lever being adapted to pivot between a rest position in which said bearing surface is at a distance from one of said attachment means which is adapted to cooperate with said one of said clipping strips and a locking position in which said bearing surface is closer to said one of said attachment means, said one of said attachment means and said bearing surface being adapted to cooperate with said one of said clipping strips so that said bearing surface is pressed against said one of said clipping strips, whereby said rigid member is locking in position on said trunking base section.

* * * * *